P. H. ROSSKAMP & L. KELLERMANN.
TROLLEY.
APPLICATION FILED AUG. 24, 1908.
911,448.
Patented Feb. 2, 1909.
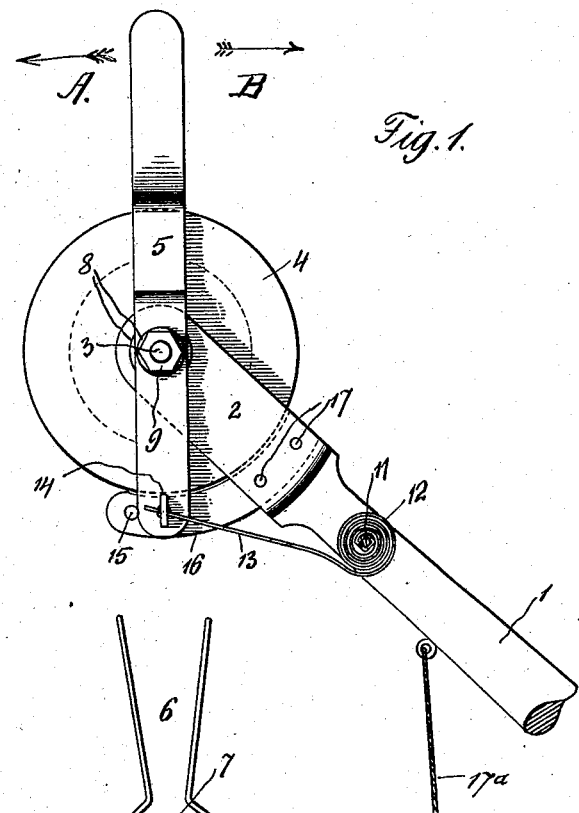
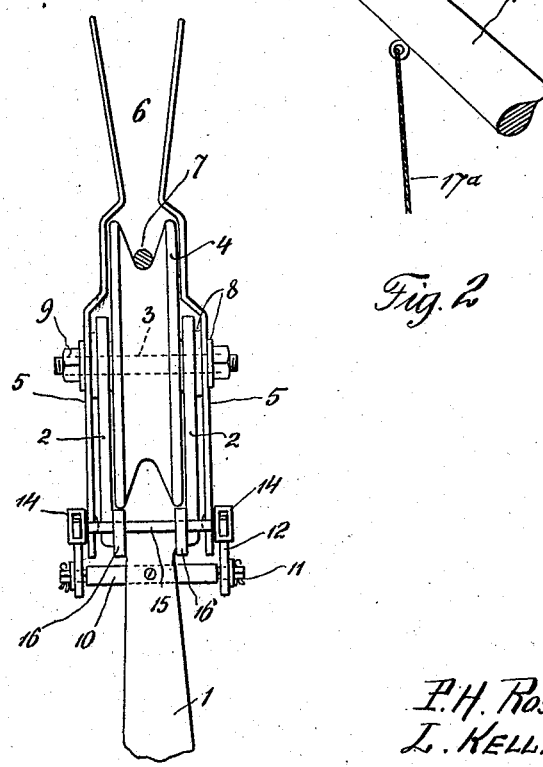
Witnesses
A. H. Rabsag,
R. H. Butler
Inventors
P. H. Rosskamp and
L. Kellermann,
By N. C. Everts
Attorneys
THE NORRIS PETERS CO., WASHINGTON, D. C.

UNITED STATES PATENT OFFICE.

PAUL H. ROSSKAMP AND LUDWIG KELLERMANN, OF TARENTUM, PENNSYLVANIA.

TROLLEY.

No. 911,448.          Specification of Letters Patent.          Patented Feb. 2, 1909.

Application filed August 24, 1908. Serial No. 449,930.

*To all whom it may concern:*

Be it known that we, PAUL H. ROSSKAMP and LUDWIG KELLERMANN, citizens of the United States of America, residing at Tarentum, in the county of Allegheny and State of Pennsylvania, have invented certain new and useful Improvements in Trolleys, of which the following is a specification, reference being had therein to the accompanying drawing.

This invention relates to trolley attachments, and the object of our invention is to provide simple and durable means in connection with a trolley harp for preventing the wheel thereof from becoming accidentally displaced from the trolley wire or an electrical conduit upon which the same travels.

Our invention aims to provide a trolley attachment that will obviate the trouble heretofore experienced by trolley wheels becoming disengaged from trolley wires, due to high speed, irregularities upon the trolley wire, and sharp curves.

Our attachment is designed for the present type of trolley harp and is of a construction that will not interfere with bridge guards, trolley wire hangers or overhead construction work.

The invention will be presently described in detail and reference will now be had to the drawing forming a part of this specification, wherein—Figure 1 is a side elevation of a trolley harp equipped with our attachment, and Fig. 2 is a front elevation of the same.

In the accompanying drawings, 1 designates a trolley pole having a harp provided by bifurcating the upper end of the pole to form two parallel arms 2. In the upper ends of the arms 2 is mounted a pin 3 upon which is journaled a trolley wheel 4. Upon the ends of the pin 3 are loosely mounted vertical arms 5, said arms being bent inwardly to overhang the arms 2 and the trolley wheel 4 and then flared outwardly to provide a V-shaped entrance 6 for a trolley wire 7, when the wheel 4 is placed upon said wire. The arms 5 are loosely mounted between washers 8 arranged upon the ends of the pin 3 and are retained thereon by nuts 9 threaded upon the ends of said pin.

The trolley pole 1 adjacent to the harp is provided with a transverse pin 10 having rectangular ends 11. Mounted upon the rectangular ends of the pin 10 are spiral springs 12 having outdrawn or flat ends 13 extending through retainers 14 carried by the outer sides of the lower ends of the arms 5. These lower ends of the arms are adapted to engage the ends of a transverse pin 15 carried by rearwardly extending curved arms 16 secured in the harp, as at 17.

With the trolley moving in the direction of the arrow A of Fig. 1, the upper ends of the arms 5 can recede when striking an overhead obstruction, but immediately upon passing said obstruction, the spiral springs 12 return the arms 5 to a vertical position in engagement with the pin 15, this pin preventing the arms from swinging in the direction of the arrow B of Fig. 1.

An ordinary trolley rope 17$^a$ can be attached to the pole 1 at any desired place to permit of the trolley wheel 4 being withdrawn from the wire 7 and said trolley wheel and trolley pole moved when placing the wheel upon the wire.

While in the drawings forming a part of this application there is illustrated the preferred embodiments of our invention, it is obvious that the same can be varied or changed as to shape, proportion and manner of assemblage without departing from the spirit of the invention.

Having now described our invention what we claim as new, is:—

1. The combination with a trolley pole, a harp carried thereby, a pin mounted in said harp, and a wheel journaled upon said pin, of arms loosely mounted upon the ends of said pin and extending upwardly over the sides of said wheel and being flared to provide a V-shaped entrance for a trolley wire, a transverse pin carried by said pole, spiral springs mounted upon the ends of said pin and having outdrawn ends, retainers carried by the lower ends of said arms to receive the outdrawn ends of said springs, rearwardly curved arms carried by said harp, and a transverse pin mounted in said arms for limiting the movement of the first mentioned arms, substantially as described.

2. The combination with a trolley pole, a harp carried thereby, and a wheel journaled in said harp, of vertical arms loosely mounted at the sides of said harp and extending upwardly over said wheel, coil springs supported by said pole and having outdrawn ends connecting with said arms for normally holding said arms in a vertical position, rearwardly extending curved arms carried by said harp, and a transverse pin arranged in said arms and engaging the first mentioned arms for limiting the movement of said first mentioned arms, substantially as described.

In testimony whereof we affix our signatures in the presence of two witnesses.

PAUL H. ROSSKAMP.
LUDWIG KELLERMANN.

Witnesses:
   Jos. FAHRBUCHEL,
   J. REINEHE.